United States Patent [19]

Hibst et al.

[11] Patent Number: 4,764,300
[45] Date of Patent: Aug. 16, 1988

[54] PREPARATION OF FINELY DIVIDED AND ACICULAR HEXAGONAL FERRITES AND THEIR USE FOR THE PRODUCTION OF MAGNETIC RECORDING MEDIA AND PLASTOFERRITES

[75] Inventors: Hartmut Hibst, Ludwigshafen; Peter Rudolf, Maxdorf; Helmut Jakusch, Frankenthal, all of Fed. Rep. of Germany

[73] Assignee: BASF Aktiengesellschaft, Ludwigshafen, Fed. Rep. of Germany

[21] Appl. No.: 865,121

[22] Filed: May 20, 1986

[30] Foreign Application Priority Data

May 23, 1985 [DE] Fed. Rep. of Germany ....... 3518481

[51] Int. Cl.$^4$ .............................................. C04B 35/26
[52] U.S. Cl. ................. 252/62.58; 252/62.59; 252/62.63
[58] Field of Search ................ 252/62.59, 62.58, 62.63

[56] References Cited

U.S. PATENT DOCUMENTS

| | | | |
|---|---|---|---|
| 2,960,471 | 11/1960 | Gorter | 252/62.5 |
| 3,082,067 | 3/1963 | Hund | 23/200 |
| 3,093,589 | 6/1963 | Downs | 252/62.5 |
| 3,382,174 | 5/1968 | Hund | 252/62.57 |
| 3,723,587 | 3/1973 | Iwase et al. | 264/61 |
| 3,793,443 | 2/1974 | Arendt | 423/594 |
| 3,903,228 | 9/1975 | Riedl et al. | 264/108 |
| 4,042,516 | 8/1977 | Matsumoto et al. | 252/62.54 |

FOREIGN PATENT DOCUMENTS

| | | | |
|---|---|---|---|
| 49-38917 | 10/1974 | Japan | 252/62.63 |
| 54-142198 | 6/1979 | Japan | . |
| 1392196 | 11/1972 | United Kingdom | . |

OTHER PUBLICATIONS

H. Kojima and K. Haneda, Ferrites: Proceedings of the International Conference, Jul. 1970 (Pub. 1971) S. 380–382.

T. Takada et al. Ferrites: Proceedings of the International Conference Jul. 1979, Japan, S. 275–278.

L. Giarda et al., Journal de Physique, Colloque C 1, Supl. 4, 38.

*Primary Examiner*—Jack Cooper
*Attorney, Agent, or Firm*—Keil & Weinkauf

[57] ABSTRACT

A process for the preparation of finely divided and acicular hexagonal ferrites of the general formula $AMe_xFe_{12-x}O_{19}$, where x is $\leq 4$, A is barium and/or strontium and Me is indium or equimolar amounts of zinc or cobalt and titanium, and their use for the production of magnetic recording media and plastoferrites.

6 Claims, No Drawings

PREPARATION OF FINELY DIVIDED AND ACICULAR HEXAGONAL FERRITES AND THEIR USE FOR THE PRODUCTION OF MAGNETIC RECORDING MEDIA AND PLASTOFERRITES

The present invention relates to a process for the preparation of finely divided and acicular hexagonal ferrites of the general formula $AMe_xFe12-xO_{19}$, where $X$ is $\leq 4$, A is barium and/or strontium and Me is indium or equimolar amounts of zinc or cobalt and titanium, and to their use for the production of magnetic recording media and plastoferrites.

For a number of applications in the field of forgery-proof coding, for example for identity cards, credit cards and the magnetic storage of other characteristic data, it is desirable to have magnetic recording media which have a higher coercive force than the standard storage media currently available. Appropriate materials would be less sensitive to extraneous magnetic fields and hence more difficult to forge.

Furthermore, plastoferrite materials possessing special magnetic and electromagnetic properties are required for specific magnetic and electromagnetic applications.

Materials usually employed for the said applications are hexagonal ferrites of the general formula $AFe12O_{19}$, where A is barium and/or strontium. The magnetic properties of these hexagonal $AFe12O_{19}$ ferrites can be modified by replacement of parts of the iron in the crystal lattice by foreign ions. For example, replacement of the Fe(III) ions by equimolar amounts of Co(II) and Ti(IV) ions results in a reduction in the strength of the anisotropic field (U.S. Pat. No. 2,960,471; G. Winkler, Z. F. Angew. Phys. 21 (1966), 282–286). Replacement of the Fe(III) ions by In(III) results in a reduction in the anisotropy constant $K_1$ and in the saturation magnetization (H. Kojima and K. Haneda, Ferrites, Proc. Int. Conf. 1970 (Pub. 1971), 380–382).

Ferrite powders for the production of substantially forgery-proof magnetic recordings are usually prepared by a ceramic process. For this purpose, barium carbonate or strontium carbonate and iron oxide are mixed in a ratio corresponding to the chemical formula of the ferrite subsequently obtained and this mixture is subjected to a heat treatment, i.e. pre-sintering, at from 1100° to 1300° C., which results in the formation of the magnetic hexaferrite. The sintered crystallite agglomerates formed are then milled to give a powder whose particle size is about 1 μm, milling generally being carried out with the addition of water. The milling procedure results in crystal defects in the particles, which reduce the coercive force. Although ferrite powders prepared in this manner generally have a very good specific remanence, the coercive force $H_c$, which is about 200 kA/m prior to milling and less than 150 kA/m after milling, is very low. Moreover, the powders obtained are too coarse for use as a magnetic pigment and furthermore have the disadvantage of possessing an extremely broad particle size spectrum. These crystal defects caused by milling can be only partially repaired by heating after the milling procedure, or by a sintering process, coercive forces of up to 300 kA/m being obtained. However, the subsequent heating procedure has the disadvantage that it results in a further decrease in the fineness of the pigment. If a coarse barium ferrite powder obtained in this manner by milling and subsequent heating is incorporated into a plastic melt to give a material having a high powder content, the result is a sharp fall in the coercive force due to the kneading process required.

It is also known that hexagonal ferrite powders can be prepared by flux processes in which fluxes, such as $B_2O_3$, alkali metal borates, PbO, alkali metal ferrites, $Bi_2O_3$, molybdates, alkali metal halides and alkali metal sulfates, are used to promote the reaction between the individual metal oxides. For example, according to U.S. Pat. No. 3,093,589, barium ferrite is prepared by heating a mixture of $BaCo_3$, acicular $\alpha$-FeOOH and from 0.1 to 1% by weight of barium chloride, which acts as a catalyst, at from 890° to 980° C. Irregular tabular crystals possessing straight edges are obtained. U.S. Pat. No. 3,793,443 describes a process for the preparation of $BaFe_{12}O_{19}$ powder from a mixture of $BaCO_3$, FeOOH and an alkali metal chloride by heating at 1000° C. Washing out the alkali metal halide gives uniform hexagonal tabular crystals. U.S. Pat. No. 3,903,228 discloses a process in which a homogeneous mixture of $BaCO_3$ and finely divided acicular $\alpha$-$Fe_2O_3$ having a specific surface area greater than 20 $m^2/g$ is heated together with from 3 to 10% by weight of NaF at from 950° to 1100° C. After washing tabular crystals having a diameter of less than 1 μm are obtained. According to U.S. Pat. No. 4,042,516, heating a mixture of 1 mole of $SrCO_3$, 6 moles of acicular $\alpha$-FeOOH and from 0.06 to 2 moles of $SrCl_2$ at 1000° C., followed by extraction with water, gives a tabular Sr ferrite having a platelet size of about 2 μm. The flux processes have the great disadvantage that the products obtained in the heat treatment generally have to be freed from the catalytic flux by washing with water or dilute acid. Moreover, the added flux is usually highly corrosive and may damage the crucible material used and, because of its high volatility, also destroy the furnaces employed.

Other known processes for the preparation of barium ferrite are those which start from specific iron oxide hydroxide powders without the addition of catalytic fluxes. For example, German Published Application DAS No. 1,911,318 describes a process for the preparation of magnetically anisotropic permanent magnets by subjecting a compression molding consisting of $BaCO_3$ and acicular $\alpha$- or $\gamma$-FeOOH to a single heat treatment at 1190°–1300° C., in which process the FeOOH needles are first mechanically aligned by the compression-molding procedure at right angles to the direction in which the pressure has been applied. U.S. Pat. No. 3,723,587 describes a two-stage process for the preparation of magnetically anisotropic permanent magnets, in which a mixture of $BaCO_3$ and acicular $\alpha$-FeOOH is pre-molded and the resulting molding is preheated at 1000° C. The preheated molding is then compression-molded under a pressure higher than that used in the pre-molding step. Further heating is then carried out at 1250° C. Japanese Pat. No. 54 142,198 describes a process for the preparation of tabular Ba ferrite and Sr ferrite, the said process starting from a filter cake consisting of oriented $BaCO_3$ or $SrCO_3$ and acicular $\alpha$-FeOOH particles. In this process, a suspension of $BaCO_3$ or $SrCO_3$ and acicular $\alpha$-FeOOH is filtered in a special manner, for example by means of gravity filtration, so that, in the resulting filter cake, the FeOOH needles lie parallel to its surface and are embedded in finely divided $BaCO_3$ or $SrCO_3$. The filter cake obtained is heated at 1100° C., either in uncomminuted form or in the form of cubes measuring from 10 to 20 mm, the FeOOH needles reacting with $BaCO_3$ or $SrCO_3$ and growing together to form a tabular hexagonal ferrite having a particle diameter of from 0.5 to 1.5 μm. The resulting sintered material is then powdered. The barium ferrite powders obtained have a coercive force of 200 kA/m, while the resulting strontium ferrite powders have a coercive force of 223 kA/m. R. Takada et al. (Proc. Intern. Conf. on Ferrites, July 1970, Japan, pages 275-278) have examined, with the aid of an electron microscope, $SrFe_{12}O_{19}$ permanent magnets produced by subjecting compression moldings consisting of $SrCO_3$ and acicular $\alpha$-FeOOH to a single sintering treatment at 1200°–1300° C. According to these investigations, the formation of the Sr ferrite in the compression moldings takes place topotactically, the crystallographic (100) plane of the $\alpha$-FeOOH being transformed into the (0001) plane of the $SrFe_{12}O_{19}$. By reacting a bulk powder consisting of a mixture of $SrCO_3$ and acicular $\alpha$-FeOOH at 1050° C. in a high-temperature fluidized bed, L. Girada et al. (J. de Physique, C1, Suppl. 4, 38 (1977), page C1-325) were the first to obtain an Sr ferrite powder having a high coercive force ($H_c$=446 kA/m) and a specific surface area of from 3 to 4 m$^2$/g. The authors attribute the requisite relatively low reaction temperature of 1050° C., the resulting fineness of the pigments, the narrow particle size distribution obtained and the consequent high coercive force to the expensive high-temperature fluidized bed technique employed.

It is an object of the present invention to provide an economical process for the preparation of a magnetic material which meets the demands made on a magnetic material intended for use in magnetic recording media and in plastoferrite materials. Such a material should be very finely divided, have a narrow particle size distribution and a comparatively high coercive force and in particular exhibit good dispersibility to enable it to be incorporated into organic binders.

We have found that this object is achieved and that, surprisingly, hexagonal ferrites which are acicular in shape and are of the formula $AMe_xFe_{12-x}O_{19}$, where x is $\leq 4$, (0.024 to 4), A is barium and/or strontium and Me is indium or equimolar amounts of zinc or cobalt and titanium, possess the required properties if, in the preparation of the said ferrites, an aqueous dispersion of acicular iron(III) oxide hydroxide is reacted with an aqueous barium chloride and/or strontium chloride solution, an aqueous Me chloride and an aqueous sodium carbonate solution, the resulting mixture is heated, the solid phase of the resulting dispersion is separated off from the aqueous phase, washed thoroughly, dried and comminuted, and the powder obtained is heated at from 800° to 1070° C.

To carry out the novel process, an aqueous solution of the $ACL_2$, an aqueous solution of the Me chloride and an aqueous solution of $Na_2CO_3$ are added to an aqueous dispersion of the acicular FeOOH. The molar Me/Fe ratio is advantageously from 0.002 to 0.5, the molar (Me+Fe)/A ratio is advantageously from 9 to 12 and the molar Na/Cl ratio is advantageously from 1 to 2. The reaction mixture is then heated for from 0.5 to 3 hours at from 60° to 100° C. After cooling, the solid phase of the resulting aqueous dispersion is separated off from the aqueous phase, this usually being done by filtration, and is washed chloride-free with water and dried. Comminution of the resulting dry material to a particle size of from 0.1 to 5 mm, preferably from 0.1 to 1 mm, is achieved by means of a dry milling process followed by a screening process. The powdered dry material is then heated for from 0.5 to 3 hours at from 800° to 1070° C. The material obtained belongs to the group consisting of the hexagonal ferrites and is of the formula $AMe_xFe_{12-x}O_{19}$.

Suitable acicular iron(III) oxide hydroxides are $\alpha$-FeOOH and $\gamma$-FeOOH. These powders are particularly suitable for the novel process when they have a specific surface area of from 15 to 80, preferably from 20 to 50, m$^2$/g and the length/width ratio of the particles is from 2 to 30:1, preferably from 5 to 25:1. The preparation of these iron(III) oxide hydroxides is known. For example, the $\alpha$-FeOOH may be obtained by the procedure disclosed in German Laid-Open Application DOS 1,592,398, while the $\alpha$-FeOOH can be prepared according to German Published Application DAS No. 1,061,760 and German Pat. No. 1,223,352 or German Laid-Open Application DOS No. 2,212,435.

The novel process yields the said ferrites directly in the form of very finely divided, unsintered powders. They consist of very small acicular crystals which have the crystal shape of the acicular FeOOH used and possess a specific surface area greater than 7 m$^2$/g. Compared with undoped acicular ferrites of the composition $AF_{12}O_{19}$ (where A is Ba or Sr), the acicular ferrites prepared according to the invention possess more advantageous particle properties; for example, they are much easier to disperse in organic binders and resins for the production of magnetic recording media. The difficulty of dispersing decreases with an increasing degree of substitution x, as can be shown with the aid of the gloss test. The greater ease of dispersing the novel acicular and very finely divided ferrite powders has the advantage that the magnetic recording media produced with the novel acicular ferrite powders possess a smoother surface than can be achieved with conventional Ba ferrite pigments.

Furthermore, the advantageous particle properties also result in improved dispersing behavior in polymer melts. Hence, the ferrite pigments prepared according to the invention are particularly useful as magnetic or electromagnetically active material in plastoferrites. For example, injection-molded plastoferrite components produced with the novel finely divided ferrites exhibit excellent surface smoothness. Since incorporation of the finely divided hexagonal ferrite powders prepared according to the invention into an organic matrix does not destroy or damage the novel finely divided and readily dispersible ferrite particles, plastoferrite materials produced from the said ferrites exhibit better magnetic and electromagnetic properties than those containing conventional coarse ferrite powders.

TEM (transition electron microscopy) investigation shows that the novel acicular ferrite powders consist predominantly of individual needles, in contrast to undoped ferrite. Apparently, coating the FeOOH needles with very finely divided zinc carbonate or cobalt carbonate and basic Ti carbonate or with very finely divided $In_2(CO_3)_3$ causes a significant reduction in the degree of sintering of the resulting ferrite needles in the reaction at elevated temperatures to give the substituted acicular barium ferrite pigment.

Furthermore, the novel process differs from the conventional flux processes in that the use of corrosive fluxes, which also have to be washed out subsequently, can be dispensed with.

A further advantage of the novel process is that the dry mixture of metal carbonates and acicular FeOOH is employed in comminuted form in the heating procedure. Consequently, the process according to the invention does not require any expensive compacting or tableting techniques or any special filtration techniques, as are necessary for the preparation of moldings with mechanical orientation of the FeOOH needles.

Furthermore, no special, expensive sintering techniques, eg. a high-temperature fluidized-bed technique, are required in the process according to the invention for heating the mixture of metal carbonates and FeOOH. Instead, heating is carried out in a conventional manner, for example by heating in a crucible, a dish or a rotary tubular furnace. The consequent, surprising advantage of the novel process over the conventional heating process is the lower reaction temperature.

The Examples which follow illustrate the invention.

EXAMPLE 1

(Comparative Example)

A dispersion which consisted of 50.00 kg of acicular α-FeOOH having a specific surface area of 27 m$^2$/g and a length/width ratio of 10:1 and 500 l of water was prepared with vigorous stirring, and a solution of 12.835 kg of BaCl$_2$·2 H$_2$O in 50 l of water was added. A solution of 7.167 kg of Na$_2$CO$_3$ in 40 l of water was then introduced with further stirring. The dispersion obtained was heated up to 90° C. and kept at that temperature for 2 hours, while stirring. After the mixture had cooled, the solid phase of the dispersion was filtered off using a conventional filter press, washed chloride-free with water and dried. The resulting dry material was dry-milled in a mill and then passed through a sieve having an aperture size of 0.3 mm. The comminuted, screened powder was heated in a stainless steel dish for 1 hour at 1000° C. and then cooled. The resulting BaFe$_{12}$O$_{19}$ powder consisted of a single phase according to the X-ray pattern and was composed of elongated ferrite particles having a specific surface area of 7.5 m$^2$/g. The coercive force ($H_c$) was 423 kA/m and the specific remanence ($M_r/\rho$) was 42 nTm$^3$/g.

To determine the relative effort required to disperse a pigment, and to predict the achievable surface smoothness of the recording medium subsequently obtained, the gloss test 2, based on DIN 53,238, was used. For this purpose, 7 g of the pigment are introduced into a 100 ml screw-cap glass bottle, and 35 g of a binder which has a viscosity of 60 mPa·s and consists of a commercial isocyanate-free polyester urethane, obtained from adipic acid, butane-1,4-diol and 4,4'-diisocyanatodiphenylmethane, a copolymer of vinyl chloride and ethyl maleate, and a mixture of an oxethylated phosphonate with an alkylamide of sulfosuccinic acid, tetrahydrofuran and dioxane, and 35 cm$^3$ of steel balls having a diameter of 2 mm are added. 2 such sample batches are then clamped on both sides of a vibrating ball mill, and dispersing is carried out. After a dispersing time of 80 minutes, and then every 40 minutes up to a total time of 320 minutes, samples of the dispersion are taken, and coating is produced in each case on a 17 μm thick polyester film using a knife coater (30 μm) from Erichsen (Model No. 335/1 ) at a coating speed of 12.8 mm/sec. This coating is left to dry for more than 12 hours in the air. The reflectometer value for the coating serves as a measure of the degree of dispersion. This value is obtained using the UME 4 universal measuring unit from Lange, with an 85° measuring head. The pairs of values dispersing time $t_i$/gloss $G_i$ obtained are then used to calculate the fitted line $$t/G = f(t)$$

from which the gloss after a dispersing time of 75 minutes (G 75) and 300 minutes (G 300) is determined. The difficulty of dispersing DH can then be calculated using the equation $$DH = (G\ 300/G\ 75 - 1) \times 100$$

The lower this value, the easier it is to disperse the pigment. G 300 is referred to as the final gloss GE (end of test). To achieve smooth surfaces, this value should be as high as possible.

In the gloss test the BaFe$_{12}$O$_{19}$ powder gave a final gloss GE of only 40.5%, and the difficulty of dispersing DH was 78.

EXAMPLE 2

A dispersion consisting of 4446 g of α-FeOOH having a specific surface area of 27 m$^2$/g and a length/width ratio of 10:1 and 45 l of H$_2$O was prepared, with vigorous stirring, and a solution of 433 g of TiCl$_4$ in 1 l of H$_2$O, a solution of 1611 g of Na$_2$CO$_3$ in 4 l of H$_2$O, a solution of 1189 g of BaCl$_2$·2 H$_2$O in 3 l of H$_2$O and a solution of 310 g of ZnCl$_2$ in 1 l of H$_2$O were added in succession, with stirring. The dispersion obtained was heated up to 90° C. and kept at that temperature for 2 hours, with further stirring. After the dispersion had cooled, the further procedure described in Example 1 was followed.

The resulting BaZn$_{0.5}$Ti$_{0.5}$Fe$_{11}$O$_{19}$ powder consisted of a single phase according to the X-ray pattern and was composed of ferrite particles having a pronounced acicular shape and a specific surface area of 9.7 m$^2$/g. The coercive force was 236 kA/m and the specific remanence ($M_r/\rho$) was 39 nTm$^3$/g.

In the gloss test according to Example 1, the BaZn$_{0.5}$Ti$_{0.5}$Fe$_{11}$O$_{19}$ powder obtained gave a final gloss GE of 59.0%, and the difficulty of dispersing DH was only 69.

EXAMPLE 3

A dispersion of 1563 g of α-FeOOH having a specific surface area of 27 m$^2$/g and a length/width ratio of 10:1 and 16 l of H$_2$O was prepared, with vigorous stirring, and a solution of 345 g of TiCl$_4$ in 0.8 l of H$_2$O, a solution of 1010 g of Na$_2$CO$_3$ in 3 l of H$_2$O, a solution of 463 g of BaCl$_2$·2H$_2$O in 1.5 l of H$_2$O and a solution of 247 g of ZnCl$_2$ in 1 l of H$_2$O were added in succession, with stirring. The dispersion obtained was heated up to 90° C. and kept at that temperature for 2 hours, with further stirring. After the dispersion had cooled, the further procedure described in Example 1 was followed.

The BaZnTiFe$_{10}$O$_{19}$ powder obtained consisted of a single phase according to the X-ray pattern and was composed of ferrite particles having a pronounced acicular shape and a specific surface area of 10.2 m$^2$/g. The coercive force was 154 kA/m, and the specific remanence ($M_r/\rho$) was 32 nTm$^3$/g.

In the gloss test according to Example 1, the BaZnTiFe$_{10}$O$_{19}$ powder obtained gave a final gloss GE of 67.5%, and the difficulty of dispersing DH was only 56.5.

EXAMPLE 4

A dispersion consisting of 251.8 g of α-FeOOH having a specific surface area of 27 M$^2$/g and a length/width ratio of 10:1 and 2.5 l of H$_2$O was prepared, with vigorous stirring, and a solution of 27.65 g of InCl$_3$ in 0.5 l of H₂O, a solution of 63.7 g of Na₂CO₃ in 0.5 l of H₂O and a solution of 67.2 g of BaCl₂·2 H₂O in 0.5 l of H₂O were added in succession, with stirring. The dispersion obtained was heated up to 90° C. and kept at that temperature for 2 hours, with further stirring. After the dispersion had cooled, the further procedure described in Example 1 was followed.

The $BaIn_{0.5}Fe_{11.5}O_{19}$ powder obtained consisted of a single phase according to the X-ray pattern and was composed of ferrite particles having a pronounced acicular shape and a specific surface area of 9.3 m²/g. The coercive force was 270 kA/m, and the specific remanence ($M_r/\rho$) was 40 nTm³/g.

We claim:

1. A process for the preparation of finely divided and acicular hexagonal ferrite of the formula $AMe_xFe_{12-x}O_{19}$ where x is from 0.024 to 4, A is barium, strontium or mixture thereof and Me is indium or equimolar amount of zinc or cobalt and titanium comprising:

adding an aqueous $ACl_2$ solution, an aqueous Me chloride solution and an aqueous sodium carbonate solution to an aqueous dispersion of acicular iron(III) oxide hydroxide to form a mixture, heating the resulting mixture to form a dispersion containing a solid phase and an aqueous phase, separating off the solid phase and thoroughly washing it, drying and comminuting the washed solid to form a powder, heating the resulting powder at from 800° to 1070° C. to obtain a finely divided and acicular hexagonal ferrite of the formula $AMe_xF_{12-x}O_{19}$ where x, A and Me are as defined above, the ferrite having the crystal shape of the acicular iron(III) oxide hydroxide in said dispersion and a lower difficulty of dispersion DH than said ferrite prepared as above absent Me.

2. The process of claim 1, wherein the acicular iron-(III) oxide hydroxide is α-FeOOH.

3. The process of claim 1, wherein the acicular iron (III) oxide hydroxide is α-FeOOH.

4. The process of claim 2, wherein the acicular FeOOH employed has a specific surface area of from 15 to 80 m²/g and a length/width ratio of from 2 to 30:1.

5. The process of claim 1, wherein the washed and dried solid material that is heated at from 800° to 1070° C. is in the form of a powder having a particle size of from 0.1 to 5 mm.

6. The process of claim 1, wherein the washed and dried solid material that is heated at from 800° to 1070° C. is in the form of a powder having a particle size of from 0.1 to 1 mm.

* * * * *